(12) United States Patent
Duerksen et al.

(10) Patent No.: US 6,438,286 B1
(45) Date of Patent: Aug. 20, 2002

(54) PROTECTION SWITCHING IN BIDIRECTIONAL WDM OPTICAL COMMUNICATION NETWORKS WITH TRANSPONDERS

(76) Inventors: Gary Duerksen, 5808 Bryn Mawr Rd., College Park, MD (US) 20740-3005; John Lynn Shanton, III, 6263 Harley Rd., Middletown, MD (US) 21769

( * ) Notice: Subject to any disclaimer, the term of this patent is extended or adjusted under 35 U.S.C. 154(b) by 0 days.

(21) Appl. No.: 09/983,071

(22) Filed: Oct. 23, 2001

Related U.S. Application Data

(63) Continuation of application No. 09/840,043, filed on Apr. 24, 2001, now Pat. No. 6,307,986.

(51) Int. Cl.[7] .................................................. G02B 6/26
(52) U.S. Cl. ........................................ 385/24; 359/127
(58) Field of Search ........................ 385/24–33, 16–18, 385/145; 359/127, 124, 110, 119

(56) References Cited

U.S. PATENT DOCUMENTS

| | | | | |
|---|---|---|---|---|
| 5,145,548 A | * | 9/1992 | Yamamoto | 100/151 |
| 5,647,035 A | * | 7/1997 | Cadeddu et al. | 359/119 |
| 5,903,371 A | * | 5/1999 | Arecco et al. | 359/110 |
| 5,930,016 A | * | 7/1999 | Brorson et al. | 359/127 |
| 6,307,986 B1 | * | 10/2001 | Duerksen et al. | 359/127 |
| 6,321,004 B1 | * | 11/2001 | Duerksen et al. | 359/124 |
| 6,333,798 B1 | * | 12/2001 | Allan et al. | 359/127 |

* cited by examiner

Primary Examiner—Akm E. Ullah

(57) ABSTRACT

The present invention provides a system for protection switching in a wavelength division multiplexed optical communication network including optical transponders within optical nodes. A work optical transponder receives a first work optical channel dropped by an optical add-drop multiplexer from an optical waveguide while a second work optical transponder adds a work optical channel to the optical add-drop multiplexer. Similarly, a first protect optical transponder is positioned to receive a protect optical channel dropped by the optical add-drop multiplexer while a second protect optical transponder is positioned to add a protect optical channel to the optical add-drop multiplexer. A detection element detects the strength of the optical channel received by the first work optical transponder;

control means responsive to the means for detecting the strength of the optical channel received by the first optical transponder, the control means activating the second protect transponder and inactivating the second work transponder when the strength of the optical channel received by the first optical transponder falls below a preset level.

14 Claims, 7 Drawing Sheets

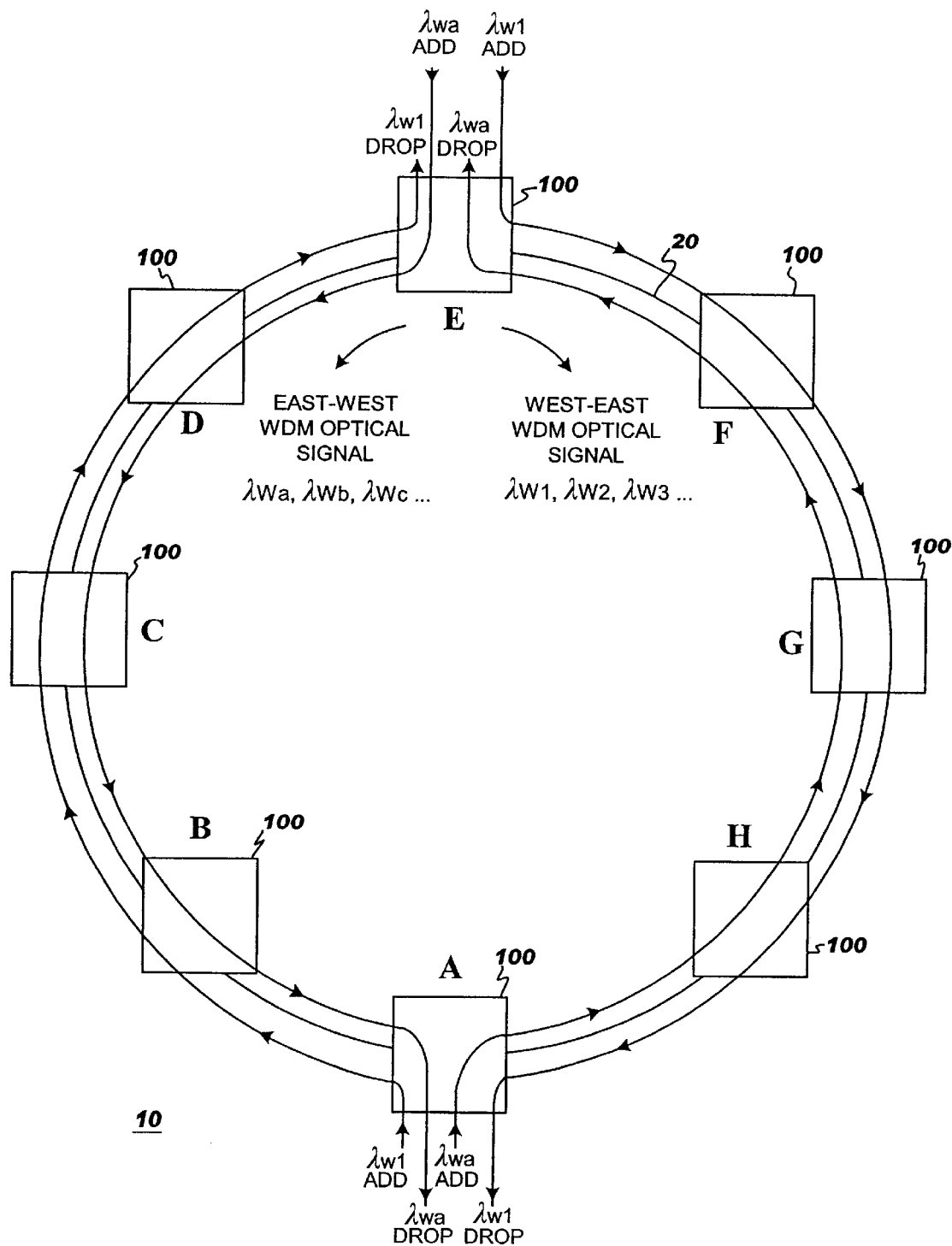

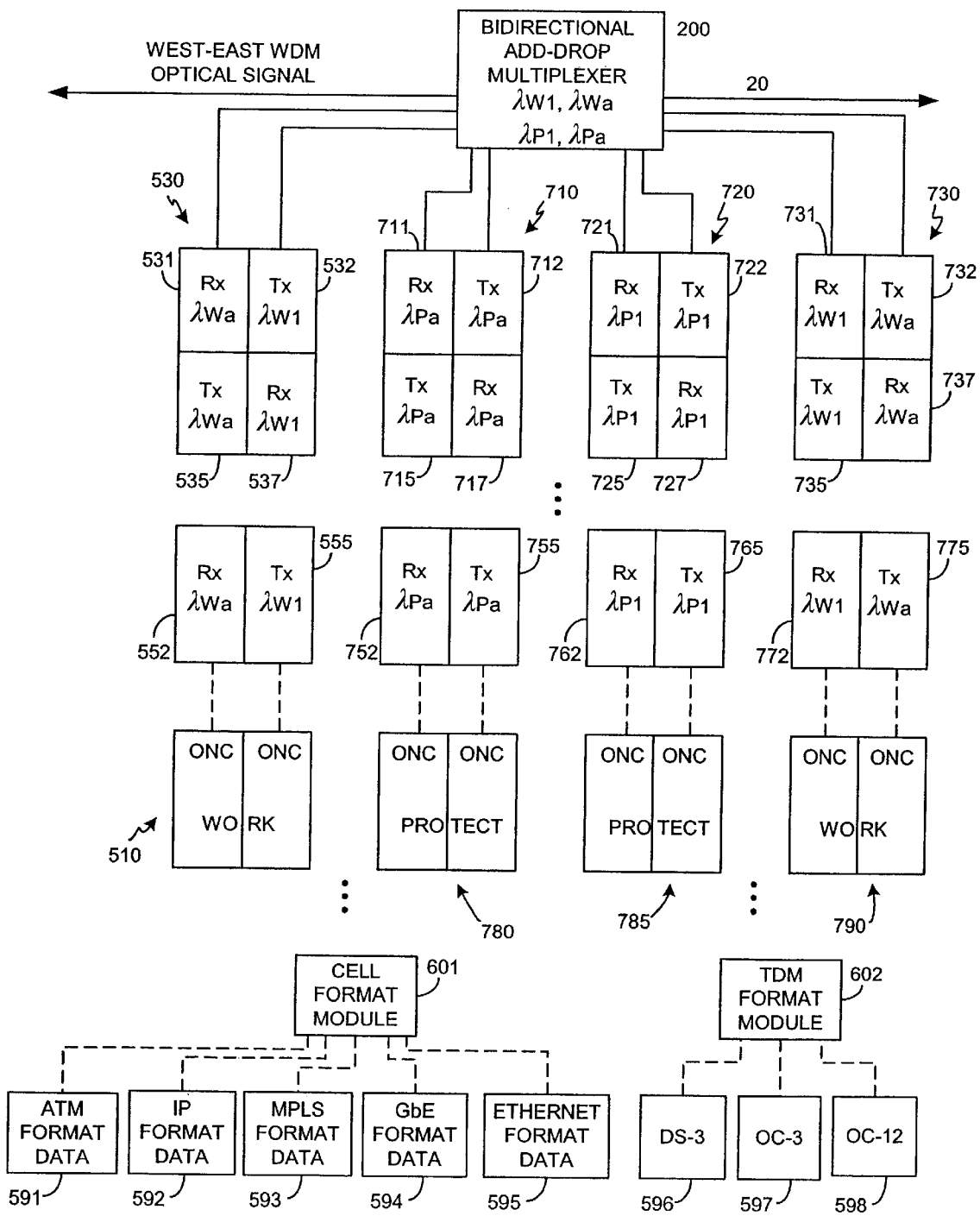

PROTECTION SWITCHING IN BIDIRECTIONAL WDM OPTICAL COMMUNICATION NETWORKS WITH TRANSPONDERS

CROSS-REFERENCE TO RELATED APPLICATION

This application is a continuation of U.S. patent application Ser. No. 09/840,043 filing date Apr. 24, 2001, now U.S. Pat. No. 6,307,986.

BACKGROUND OF THE INVENTION

1. Field of the Invention

The present invention relates to optical communication networks in general and, more particularly, to bidirectional optical communication networks in which two wavelength division multiplexed optical communication signals propagate in opposite directions on a bidirectional optical waveguide. Following a waveguide failure (e.g., fiber cut) or equipment failure, optical traffic is successful re-routed in order to avoid an interruption in communication services.

2. Description of the Related Art

As the need for communication signal bandwidth increases, wavelength division multiplexing (WDM) has progressively gained popularity for multiplying the transmission capacity of a single optical fiber. A review of optical networks, including WDM networks, can be found in Ramaswami et al., *Optical Networks: A Practical Perspective* (Morgan Kaufman, © 1998), the disclosure of which is incorporated herein by reference. Typically, wavelength division multiplexed optical communication systems have been designed and deployed in the long-haul, interexchange carrier realm. In these long-haul optical systems, a wavelength division multiplexed optical communication signal comprising plural optical channels at different wavelengths travels in a single direction on a single fiber (unidirectional transmission). Because the communication traffic in such systems commonly travels many hundreds of kilometers, the need for add-drop multiplexing of individual channels is infrequent (if at all), occurring at widely-spaced add-drop nodes.

Although the optical infrastructure of long-haul WDM optical systems can accommodate future traffic needs created by increased demand from traditional and multimedia Internet services, this traffic must first be collected and distributed by local networks. Currently, such local networks are structured to carry a single wavelength, time-division multiplexed (TDM) optical signal along a fiber network organized into various ring structures. To route the various components of the TDM signal, numerous electronic add-drop multiplexers are positioned along the fiber network. At each add-drop location, the entire optical signal is converted into an electrical signal; the portions of the electrical signal which are destined for that add-drop point are routed accordingly. The remaining portions of the electrical signal are converted back to a new TDM optical signal and are output through the electronic add-drop multiplexer. Thus, before a user can access the bandwidth-rich WDM long-haul transport networks, he must first pass through the bottleneck of the local networks.

Although unidirectional WDM optical systems are suitable for conventional long-haul interexchange carrier markets(e.g., "point-to-point" optical systems), metropolitan (local) communications systems require extensive routing and switching of traffic among various nodes positioned within optical fiber rings. Further, in order to maximize the effectiveness of wavelength division multiplexing in these local areas, it would be useful to implement bidirectional WDM optical systems, e.g., to enhance network design flexibility. In a bidirectional WDM system counterpropagating WDM optical signals, each of which carry a number of optical channels, are carried on the same waveguiding medium, such as a single optical fiber. Implementation of a bidirectional system requires several considerations not present in the conventional unidirectional optical systems.

One such consideration is the ability to switch communication traffic from a "work" path to a "protect" path in the event that there is a disruption in the waveguiding medium (e.g., a fiber cut) or there is an equipment failure at any point within the optical system. In conventional, unidirectional optical systems, optical traffic is frequently routed to another optical waveguide or another optical ring. Such techniques are depicted in U.S. Pat. Nos. 5,982,517 and 5,327,275. Although these systems permit continuation of optical traffic in the event of a fiber cut, they require the presence of an additional optical path, such as a spare optical fiber; such extra capacity is often in short supply in crowded metropolitan regions. Further, since "protect" optical fibers often are damaged during disruption of the "work" fiber, such protection switching may not be available.

Unique issues are presented in bidirectional WDM optical communication systems since both east-west and west-east WDM optical signals propagate along a single optical waveguide. Consequently, if the waveguide is interrupted, optical signals traveling in each direction must be re-routed. Complexity is increased if the system features "wavelength re-use," i.e., when a wavelength used to carry traffic along one span between two given optical nodes is later employed to carry optical traffic between two different optical nodes. For bidirectional optical systems featuring wavelength re-use, care must be taken that optical traffic routed to a protect path does not interfere with work traffic traversing the same optical span.

Additional issues are presented by the potential failure of optical transmitting/receiving equipment within a bidirectional optical network. Any protection switching scheme must be able to handle protection switching both in the event of a disruption in the optical waveguide and the failure of optical equipment at any point within the optical network.

Thus, there is a need in the art for improved protection switching systems for wavelength division multiplexed optical communication networks, in particular, bidirectional WDM optical networks. Such improved protection switching could be used to implement wavelength division multiplexing in fiber-constrained metropolitan networks.

SUMMARY OF THE INVENTION

The present invention provides a system for protection switching in a wavelength division multiplexed optical communication network including optical transponders within optical nodes. The optical communication network includes plural optical nodes, each optical node having the ability to add and drop an optical channel from an optical waveguide configured to carry wavelength division multiplexed optical communication signals. A first work optical transponder is positioned to receive a first work optical channel dropped by the optical add-drop multiplexer and includes a receiving portion for converting the dropped work optical channel to an electrical signal and transmitting portion for generating a short-reach optical signal modulated with information from the dropped work optical channel. A second work optical transponder is positioned to add a work optical channel to the optical add-drop multiplexer, the second work optical transponder including a work optical transmitter for creating a work optical channel to be added to a wavelength division multiplexed optical signal carried by the optical waveguide and a receiving portion for receiving a short-reach optical signal modulated with information to be placed on the work optical channel to be added.

To protect the traffic carried by the work optical channels, a first protect optical transponder is positioned to receive a protect optical channel dropped by the optical add-drop multiplexer, the first protect optical transponder including a receiver portion for converting the dropped protect optical channel to an electrical signal and transmitting means for generating a short-reach optical signal modulated with information from the dropped protect optical channel. A second protect optical transponder is positioned to add a protect optical channel to the optical add-drop multiplexer and includes an optical transmitter portion for creating a protect optical channel to be added to a wavelength division multiplexed optical signal carried by the optical waveguide and a receiving portion for receiving a short-reach optical signal modulated with information to be placed on the protect optical channel to be added.

The strength of the optical channel received by the first work optical transponder is detected and a controller responsive to the detector activates the second protect transponder and inactivates the second work transponder when the strength of the optical channel received by the first work optical transponder falls below a preset level.

Similarly, when a protect optical channel is received by the first protect optical transponder, the protect optical channel is launched by the second protect transponder and the first work optical transponder is inactivated.

BRIEF DESCRIPTION OF THE DRAWINGS

FIG. 1C shows a bidirectional wavelength division multiplexed optical communication network according to the present invention employing optional wavelength re-use.

FIG. 5 depicts a further embodiment of an optical node for a bidirectional wavelength division multiplexed optical communication network.

DETAILED DESCRIPTION

Figure 1A:
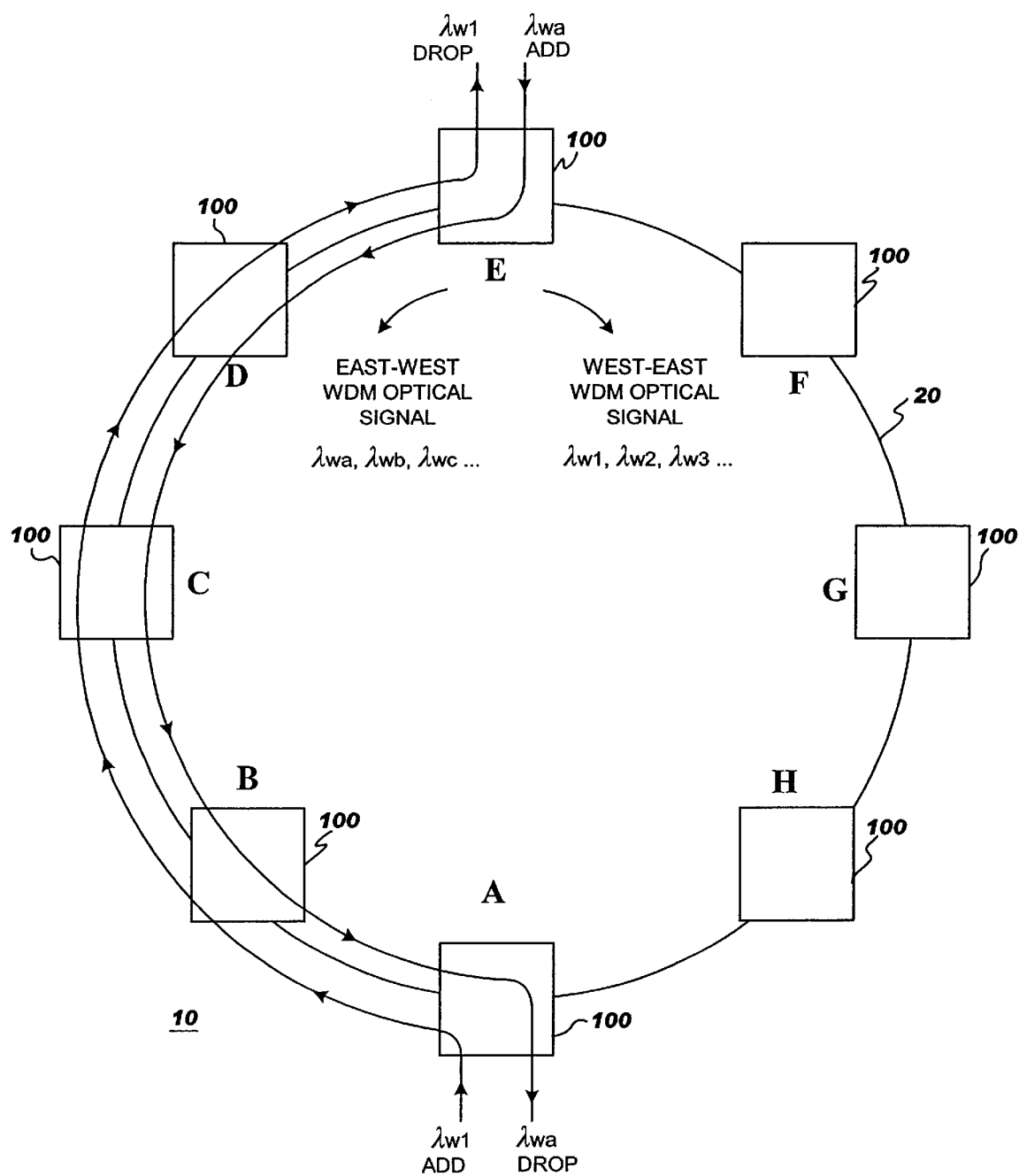
FIG. 1A is a bidirectional wavelength division multiplexed optical communication network according to one embodiment of the present invention.

Turning to the drawings in detail, FIG. 1A depicts a bidirectional wavelength division multiplexed optical communication network 10 according to one embodiment of the present invention. Bidirectional WDM optical network 10 comprises a bidirectional waveguide 20 configured to carry two counter-propagating wavelength division multiplexed optical communication signals, each comprising plural optical channels at different channel wavelengths. In accordance with traditional industry nomenclature, one of the WDM signals propagating in a first direction is designated the west-east WDM signal while the WDM signal propagating in the opposite direction is designated the east-west WDM signal. The individual optical channels in the west-east WDM optical signal are denoted by the symbols $\lambda_1$, $\lambda_2$, $\mu_3$ etc., while the individual optical channels in the east-west WDM optical signal are denoted by the symbols $\lambda_a$, $\lambda_b$, $\lambda_c$, etc. for clarity of presentation. For further clarification, working channels traveling in the west-east direction will be shown as $\lambda_{W1}$, $\lambda_{W2}$, $\lambda_{W3}$ etc., working channels traveling in the east-west direction as $\lambda_{Wa}$, $\lambda_{Wb}$, $\lambda_{Wc}$, etc.; protection channels traveling in the west-east direction will be designated as $\lambda_{P1}$, $\lambda_{P2}$, $\lambda_{P3}$, etc. while those traveling in the east-west direction will be designated $\lambda_{Pa}$, $\lambda_{Pb}$, $\lambda_{Pc}$, etc. As used herein, the expression "wavelength division multiplexed" or "WDM" refers to any optical system or signal composed of plural optical channels having different wavelengths, regardless of the number of channels in the system or signal. As such, the term "wavelength division multiplexing" or "WDM" encompasses all categories of WDM such as DWDM (dense wavelength division multiplexing) and CWDM (coarse wavelength division multiplexing). Any medium capable of carrying a WDM optical signal may be used as waveguide 20; typically an optical fiber or other waveguiding medium is employed (e.g., Corning SMF-28, LEAF®, etc.). Both dispersion-shifted and non-dispersion shifted optical fibers may be used in the networks of the present invention.

It is noted that although bidirectional optical network 10 of FIG. 1 is depicted as an optical ring network, the present invention may be employed using various configurations of bidirectional waveguide or waveguides, each of which carries two counter-propagating WDM optical signals including plural channels. Examples of other network topologies in which the present invention may be employed include mesh networks, point-to-point networks, subtended ring networks, or other network topology having at least one bidirectional optical waveguide. The term "optical network," as used herein, describes any optical system that includes at least one optical signal generator, at least one optical receiver, and an optical transmission medium such as an optical waveguide. Such a network may carry various types of information traffic, including, but not limited to, audio, video, data, and voice traffic encoded on optical channels.

Interposed along bidirectional optical waveguide 20 are a series of optical nodes 100. Optical nodes 100 include optical transmitters for launching optical channels and add-drop multiplexers for inserting and/or removing optical traffic to/from bidirectional waveguide 20. Depending upon the overall network configuration, channels may be added and dropped at each node 100. Alternatively, some nodes may be dedicated to adding channels only and other nodes to dropping channels only. In a further configuration, an individual node may be dedicated to both adding and dropping optical channels for traffic propagating in a single direction along the bidirectional waveguide (i.e., either the west-west or the west-east direction). In the latter two configurations, nodes which do not perform all the add/drop functions are interspersed among nodes performing complimentary functions in order to create the complete optical network (e.g., a west-east add/drop node alternated with an east-west add-drop node in a mesh configuration).

For the optical network of FIG. 1A, each node adds and drops optical channels to/from each of the counterpropagating WDM optical signals on the bidirectional waveguide. Typically, this function may be performed using a bidirectional WDM add/drop multiplexer. An exemplary WDM bidirectional add/drop multiplexer is depicted in commonly-assigned U.S. patent application Ser. No. 09/677, 764, the disclosure of which is incorporated herein by reference. Depending upon the size of the optical network, optical amplifiers may optionally be added at one or more network nodes 100 or incorporated into the add-drop multiplexer (as shown in one embodiment of the above-referenced application).

For the bidirectional optical ring network of FIG. 1A, each of the bidirectional WDM optical signals comprises 32 "work" optical channels, i.e., those channels launched when all portions of the network and the optical path (bidirectional optical waveguide 20) are functional. Each of the 32 work channels in the east-west direction is associated with another of the 32 work channels in the west-east direction to form a channel pair. In the network of FIG. 1A, the arbitrary path of a channel pair is traced between optical nodes A and E. Channel $\lambda_{W1}$, originates at node A and is dropped at node E. Similarly, $\lambda_{Wa}$ is added at node E and dropped at node A, forming a bidirectional work channel pair. Again, it is noted that these origins and destinations are exemplary; the bidirectional network 10 may be dynamically configured for any desired origin/destination of a particular channel through the use of tunable lasers and/or tunable channel selectors within the optical nodes.

For the 32 bidirectional channel pairs (64 optical channels total) of the exemplary network of FIG. 1A, each optical node is configured to add/drop 4 optical channel pairs (8 channels total). These "work" optical channel pairs are arbitrarily designated as such and are the channels launched following system/network initialization. In one sense, they may be viewed as the "default" optical channels, i.e., the optical channels used when all portions of the network and all portions of the optical path are fully functional.

In general, for an optical network having M work channels propagating in the west-east direction and N work channels propagating in the east-west direction, there are provided X optical channels configured to propagate in the west-east direction to protect the N work channels and Y optical channels configured to propagate in the east-west direction to protect the M work channels (M, N, X, and Y being whole numbers greater than or equal to 2). In the simplest case, M=N=X=Y; however, depending upon the overall channel plan and the configuration of the optical nodes, fewer protection channels may be required.

The path traversed by a single channel pair is depicted in FIG. 1A for clarity. As shown, $\lambda_{W1}$ is added at node A and traverses nodes B, C, and D along optical waveguide 20 until it is dropped at node E. Similarly, $\lambda_{Wa}$ is added at node E and traverses nodes D, C, and B along waveguide 20 until it is dropped at node A. Note that the lines between nodes A and E in FIG. 1A show the path of travel of the optical channels, not additional waveguides. Only bidirectional optical waveguide 20 carries the optical traffic of network 10 in FIG. 1A.

To implement protection switching in the optical network of FIG. 1A using a single bidirectional optical waveguide, additional optical channel transmission capability is provided using optical wavelengths reserved as protection wavelengths within the optical network. For the 32 channel pair example in the 8 node optical network of FIG. 1, an additional 32 channel pairs of capacity are provided in the optical network for use as protection channels in the event of a disruption in the optical waveguide (e.g., a fiber cut) or an optical node failure. To implement protection switching in a single waveguide bidirectional network, loss of traffic through a waveguide failure point must be compensated by routing of that traffic in another direction within the optical network to reach the destination optical node(s). When bidirectional optically-amplified nodes are employed using C and L band optical amplifiers for each of the counter-propagating WDM optical signals, protection channels propagating in the direction opposite to the work direction will have wavelengths in the opposite wavelength band. That is, C-band work channels will be paired with L-band protect channels and L-band work channels will be paired with C-band protect channels. In this manner, optical channels will be appropriately amplified even in the event of a node or waveguide failure.

Figure 1B:
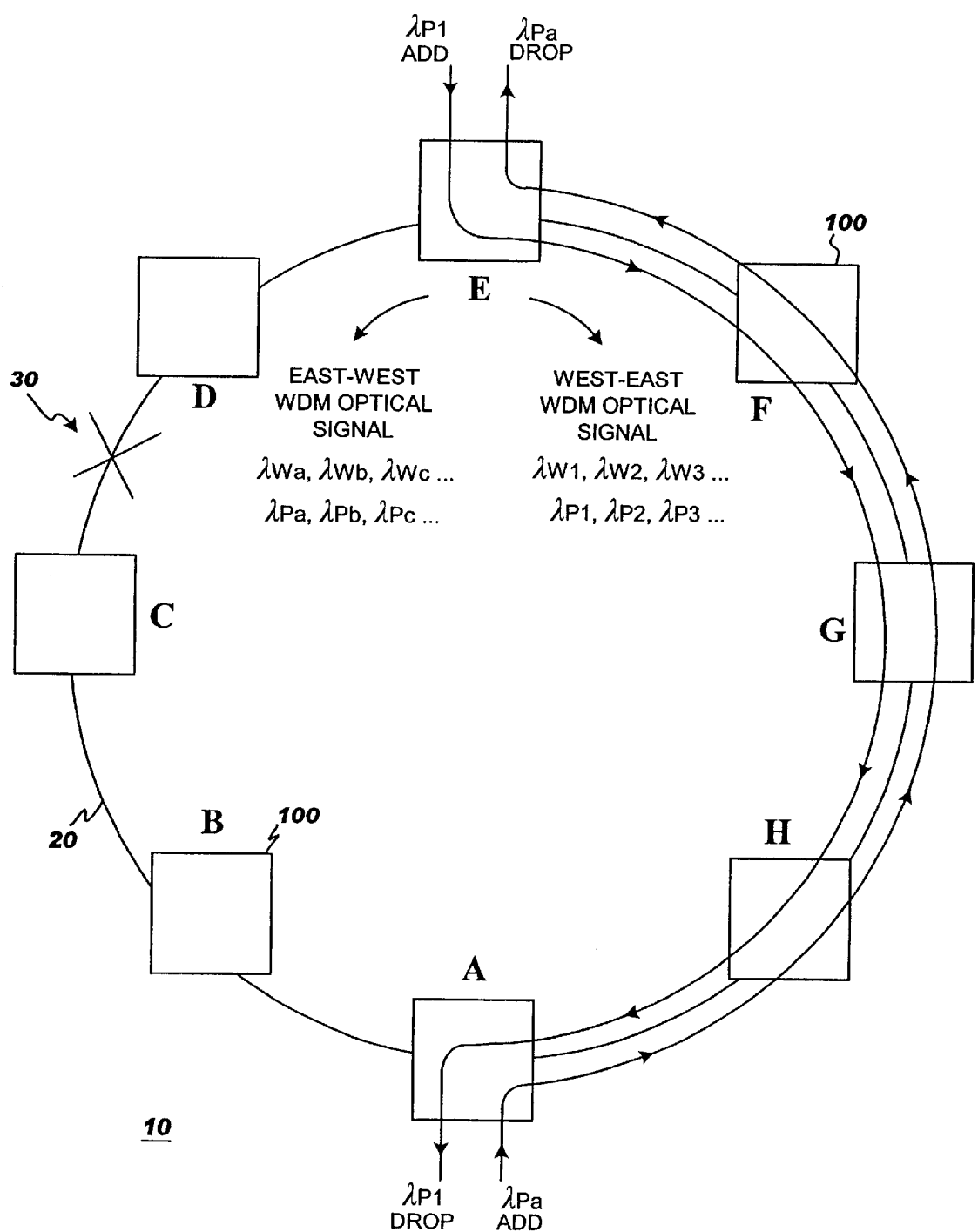
FIG. 1B depicts a bidirectional wavelength division multiplexed optical communication network with a disruption in the optical waveguide requiring protection switching of optical traffic.

FIG. 1B depicts an example of protection switching when bidirectional optical waveguide 10 is disrupted (e.g., a fiber cut); this discontinuity is indicated by element 30 between optical nodes C and D in FIG. 1B. The disruption in the optical waveguide affects channel pair $\lambda_{W1}$, and $\lambda_{Wa}$ traveling between nodes A and E as shown in FIG. 1. In a single-waveguide protection switching plan, the optical traffic carried on channel pair $\lambda_{W1}$, $\lambda_{Wa}$ must now travel around the other portion of the optical network (e.g., through optical nodes F, G, and H rather than through optical nodes B, C, and D) to arrive at the appropriate termination nodes. In order to prevent interference in other portions of the optical network having wavelength re-use, each work channel pair is assigned a protect channel pair having different optical wavelengths than those used by the work channel pair. In the exemplary embodiment in which west-east and east-west traffic is respectively placed on channels within the C-band and the L-band, a C-band work channel is protected by an L-band protect channel; similarly, an L-band work channel is protected by a C-band protect channel. Consequently, when the protect channel pair is launched, it will be optically amplified by the appropriate C-band and L-band amplifiers since the protect channels traverse the optical network in the direction opposite to the direction of propagation of the work channels.

As seen in FIG. 1B, the information formerly carried by optical channels $\lambda_{W1}$ and $\lambda_{Wa}$ is placed on new optical channels $\lambda_{P1}$ and $\lambda_{Pa}$ having wavelengths different from the wavelengths of channels $\lambda_{W1}$ and $\lambda_{Wa}$. When $\lambda_{W1}$ is a C-band work channel then $\lambda_{P1}$ is an L-band protect channel; likewise, when $\lambda_{Wa}$ is an L-band work channel then $\lambda_{Pa}$ is a C-band protect channel for the exemplary embodiment using C-band and L-band amplifiers in optical nodes 100. In a preferred embodiment, the protect optical channels are assigned channel wavelengths which are different from any of the work channels carried by optical network 10. However, depending upon the particular network configuration, and taking into account origin and destination nodes, it is possible to use some of the same wavelengths for both work and protect channels as long as its optical path is not co-extensive with an optical channel (work or protect) that is assigned the same channel wavelength.

Figure 2:
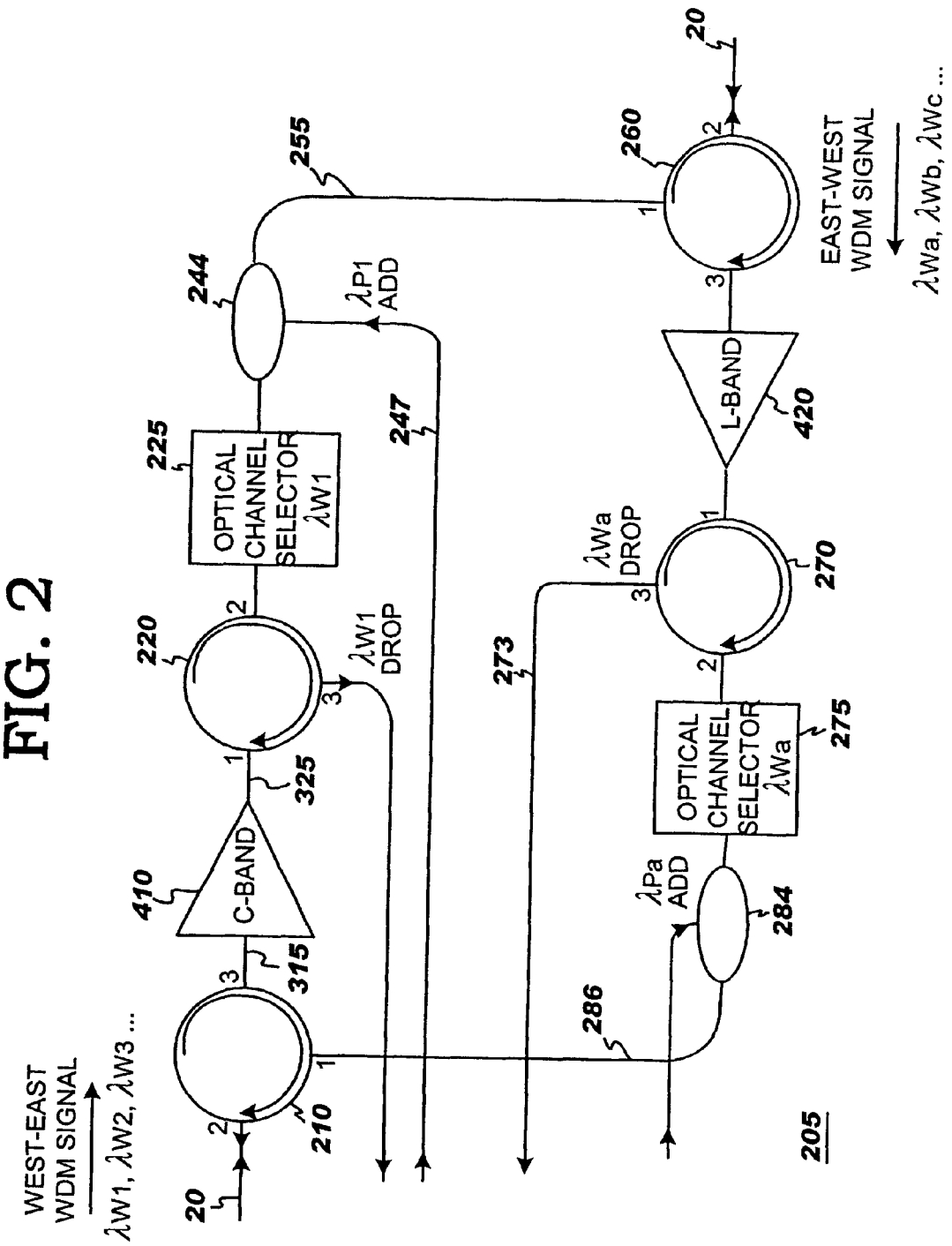
FIG. 2 depicts an exemplary add-drop multiplexer which may be used in a bidirectional optical network.

Typically, an optical node may include an add-drop multiplexer configured such that it includes channel selectors for both a work channel pair and a protect channel pair. Such a coupling of a work channel pair and a protect channel pair may be made in a bidirectional add-drop multiplexer or in a multiple add/drop multiplexers. An exemplary bidirectional add drop multiplexer 200 that includes a work C-band/L-band channel pair and a protect L-band/C-band channel pair is depicted in FIG. 2. In FIG. 2, bidirectional add-drop multiplexer 205 optically communicates with bidirectional optical waveguide 20. As used herein, the expression "optically communicates" designates an optical path between two elements. The optical path may be a direct path or it may route through intermediate optical devices (e.g., optical isolators, additional optical circulators, filters, amplifiers, connectors, etc.).

The bidirectional optical add-drop multiplexer 205 includes four three-port optical circulators, 210, 220, 260, and 270. In each of these three-port circulators, optical signals entering the first optical port of the circulator are Faraday rotated to exit the second optical port. Similarly, optical signals entering the second optical port exit through the third optical port while signals entering the third optical port exit through the first optical port. The operation of optical circulators is discussed in *Optical Networks: A Practical Perspective*, incorporated by reference above. In the present invention, any device which is capable of transferring optical signals among plural input and output ports may be used for elements 210, 220, 260, and 270 in the bidirectional add-drop multiplexer. Three-port optical circulators such as those depicted in FIG. 1 are commercially available from a variety of sources including JDS Uniphase, AOC Technologies, and Tokin and will not be further described here.

As seen in FIG. 2, the west-east WDM optical signal enters optical port 2 of circulator 210 where it is output through port 3 to optical path 315. Any medium capable of carrying a WDM optical signal may be used as an optical path; typically an optical fiber or other waveguiding medium is employed. Optical path 315 optically communicates with an optical amplifier 410. In an exemplary embodiment in which west-east optical channels fall within the C-band of the gain profile of an erbium-doped fiber amplifier and the east-west optical channels fall within the L-band of an erbium doped fiber amplifier, optical amplifier 410 is selected to have a relatively flat gain spectrum across the C-band of the amplifier (nominally defined as wavelengths from approximately 1530–1565 nm) and is therefore designated as a "C-band amplifier." C-band optical amplifiers are commercially available from SDL, BaySpec, Moec, MPB, and Alcatel; both single stage and multiple stage amplifiers are contemplated for use in the optical networks of the present invention. However, as appreciated by those of ordinary skill in the art, optical amplifier 410 may be selected from any device capable of optically amplifying an optical signal without the need for conversion to an electrical signal. Such devices include, but are not limited to, doped fiber amplifiers (e.g., erbium-doped fiber amplifiers with or without additional fiber dopants), doped waveguide amplifiers, semiconductor optical amplifiers, Raman optical amplifiers, etc. Particulars of various optical amplifiers may be found in Chapter 3 of *Optical Networks: A Practical Perspective*, incorporated by reference above.

The optically-amplified west-east WDM signal exiting amplifier 410 traverses optical path 325 and enters the first optical port of circulator 220. Upon entering the first port of circulator 220, the west-east optical signals are transferred to output port 2. Output port 2 of circulator 220 optically communicates with optical channel selector 225. Upon encountering optical selector 225, one or more channels to be dropped from the west-east WDM signal are selected and routed back towards the second optical port of circulator 220. The remaining optical channels of the west-east WDM signal, i.e., the "through" channels $\lambda_{W2}, \lambda_{W3} \ldots$, are routed towards first optical port of circulator 230. In the example depicted in FIG. 1, channel $\lambda_{W1}$, is selected by channel selector 225 and routed back through optical port 2 where it is "dropped" at optical port 3 of circulator 220 onto optical path 227. From there, the selected optical channel may be routed directly to a receiver or it may be directed to another bidirectional (or unidirectional) optical system (e.g., an optical ring network serving a different geographical region). In this manner, individual optical channels may be leased/contracted to individual customers for exclusive use by that customer.

Optical channel selector 225 may be selected from any static or reconfigurable optical device which is capable of separating or otherwise routing one or more optical wavelengths from a wavelength division multiplexed optical signal. Such devices include, but are not limited to, Bragg gratings, tunable Bragg gratings, Fabry-Perot filters, acousto-optic tunable filters, multilayer dielectric thin film filters, arrayed waveguide gratings (AWGs) and/or combinations of these devices. Detailed descriptions of such optical selection devices are found in chapter 3 of *Optical Networks: A Practical Perspective*, as well as in many of the patents, incorporated by reference above. In the exemplary embodiment of FIG. 2, optical channel 225 includes a Bragg grating configured to reflect optical channel $\lambda_{W1}$ In the event of a disruption in the bidirectional optical waveguide or failure of transmitter or receiver equipment, the optical traffic normally carried by $\lambda_{Wa}$ will be routed to $\lambda_{P1}$, is as shown in FIG. 1B; note that $\lambda_{P1}$ is transmitted in the opposite direction from $\lambda_{Wa}$ as discussed above. Therefore, as a C-band channel, $\lambda_{P1}$ is added from optical path 247 to the west-east direction by add-drop multiplexer 205 via optical coupler 244. Optical coupler 244 is typically a fused fiber coupler, commercially available from Gould, Tokin, and TDK; however, any optical device capable of adding an optical channel to an optical path may be used for device 244. Note that $\lambda_{P1}$ is added only when protection switching is triggered at the given nodes in the optical network. Although not shown in FIG. 2, other optical channels (work or protect) may be added to the west-east WDM optical signal via optical path 247 and optical coupler 244. Importantly, this feature permits the bidirectional add-drop multiplexer to be asymmetrical; that is, the optical channels added need not be the same as those dropped. The added and dropped channels may have different wavelengths and/or differ in quantity. They may be work channels, protect channels, or a mixture of work and protect channels.

To exit bidirectional add-drop multiplexer 205, the west-east optical channels pass through optical coupler 244 and are placed on optical path 255. Optical path 255 leads to the first port of optical circulator 260; the west-east WDM optical signal exits through port 2 of circulator 260 towards bidirectional waveguide 20. Simultaneously, east-west traffic enters the bidirectional add-drop multiplexer through port 2 of circulator 260, exiting through port 3 towards optical amplifier 420. In the exemplary embodiment, amplifier 420 is an L-band optical amplifier but may also be selected from any of the other devices discussed above in connection with amplifier 410.

The east-west optical traffic proceeds towards optical circulator 270 entering through port 1 and exiting through port 2 towards optical channel selector 275. Optical channel selector 275 is substantially similar to selector 225 in that it may be comprised of the optical elements set forth above. In the embodiment of FIG. 2, optical channel selector 275 includes a Bragg grating configured to reflect optical channel $\lambda_{Wa}$ The dropped optical channel exits through port 3 of circulator 270 onto optical path 273.

In the event that the optical node is in protection mode, optical channel $\lambda_{Pa}$ will be added, carrying the optical traffic originally carried by $\lambda_{W1}$. As with the west-east protection channel, $\lambda_{Pa}$ is added via optical coupler 284 to the east-west WDM optical signal. Completing the optical path towards bidirectional optical transmission waveguide 20, the east-west optical WDM signal is placed onto optical path 286 by optical coupler 244. From there, the east-west signal is input to the first optical port of the first optical circulator 210 and is continually output to bidirectional waveguide 20 through port 2 as the west-east WDM optical signal is continually input through the same port.

Figure 4:
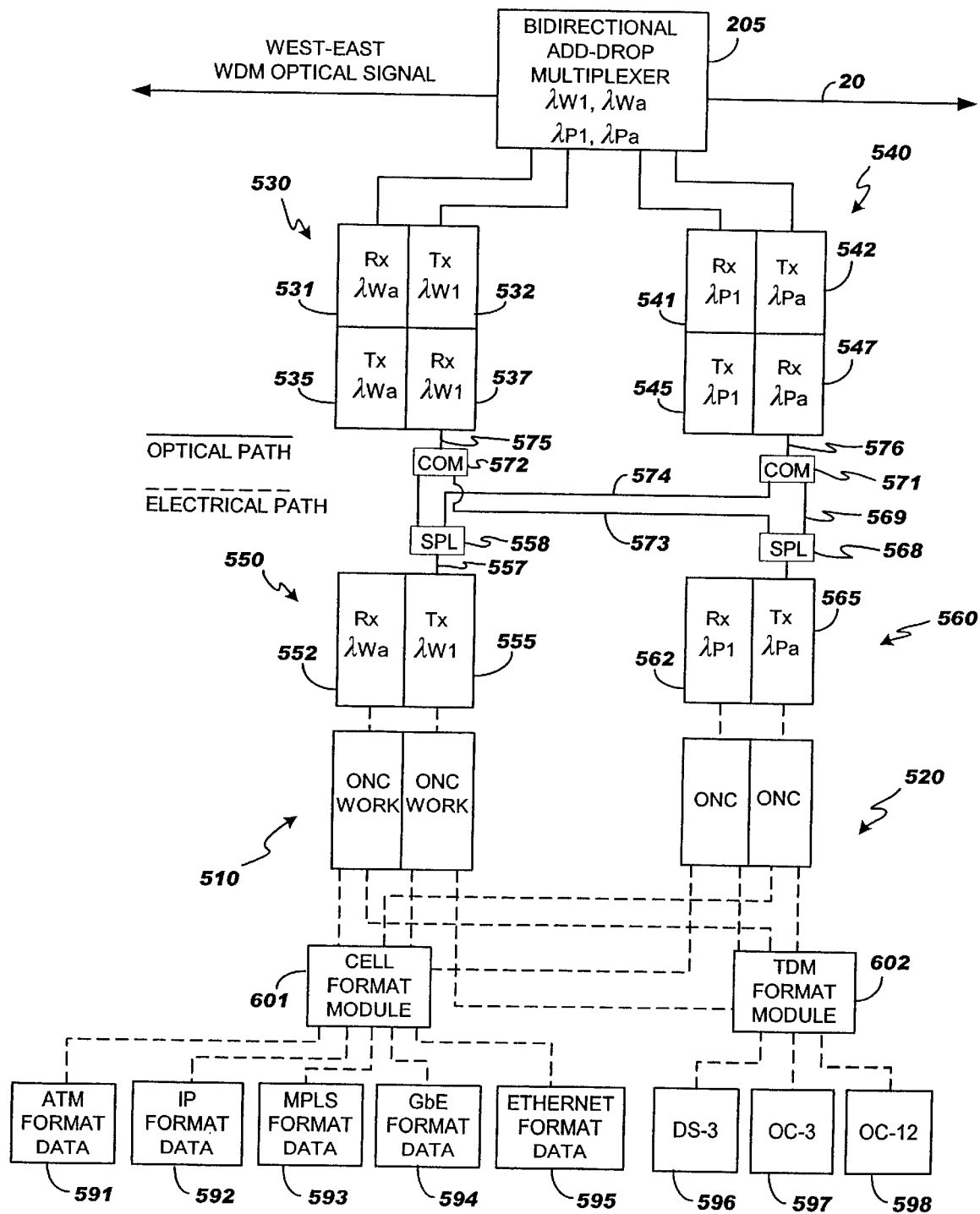
FIG. 4 depicts an exemplary optical node for a bidirectional wavelength division multiplexed optical communication network.

In an exemplary embodiment, each bidirectional add-drop multiplexer is constructed to add-drop one work channel pair and one protect channel pair. For optical nodes in which more optical channels are to be add-dropped, additional bidirectional add-drop multiplexers are added in series at the node; alternatively, more channel-selecting elements may be added to each of the of the channel selectors. At each optical node, traffic is aggregated onto the optical channels to be placed onto the bidirectional waveguide via the add-drop multiplexer(s). FIG. 4 depicts an exemplary optical transmitter/receiver system that may be employed in optical nodes 100 in connection with add-drop multiplexers 205 to implement the above-described protection switching system or to implement a protection switching system in the event of an intra-node equipment failure. The optical node is illustrated with channels $\lambda_{W1}, \lambda_{Wa}, \lambda_{P1}$, and $\lambda_{Pa}$ for clarity; however, it is understood that a fully populated optical node will typically include more optical channels being add-dropped than those depicted in FIG. 4. The protection-switching scheme of FIG. 4 uses optical transponders 530, 540 between bidirectional add-drop multiplexer 205 and optical network interfaces 510, 520. As used herein, the term "transponder" applies to any device, which received an optical signal, converts that signal to an electrical signal and uses that electrical signal to modulate, wither directly or through external modulation, another optical signal.

Transponders 530, 540 both receive the optical channels dropped by add-drop multiplexers 205 at receive portions 531 (work) and 541 (protect) and produce the optical channels to be added by the add-drop multiplexers at transmit portions 532 (work) and 542 (protect). Transponders 530, 540 include short-reach optical interfaces 535/537, 545/547 for producing/receiving short reach optical signals to/from short reach transmitters/receivers 550, 560. The expression "short-reach" relates to any optical wavelength used to transmit over short optical paths, generally paths less than approximately 1 kilometer. Typically, short-reach transmitters use 1310 as the transmitter wavelength; however, any optical wavelength that meets the above criterion, may be employed as the short reach transmitter wavelength. Further, the use of short-reach optical interfaces is itself exemplary; any optical signal transmitters/receivers may be employed in transponders 530, 540.

When the work optical channel $\lambda_{W1}$ is received at 531, it is converted to an electrical signal, which is used to modulate the optical signal emitted at 535. This signal is received at the receive portion 552 of optical transmitter/receiver 550 and converted to an electrical signal. The electrical signal is then routed electrically to/from optical network interfaces 510, 520. From the optical network interfaces 510, 520 portions of the electrical signal are routed to various data format modules 591, 592, 593, 594, 595, 596, 597, 598 via cell format and TDM format modules 601, 602. Further details of this routing are described in assignee's copending patent application Ser. No. 09/688,804 filed Oct. 17, 2000, entitled "WDM Optical Communication System With Channels Supporting Multiple Data Formats," the disclosure of which is incorporated by reference herein. Note that the manner in which information is aggregated onto the optical channels shown in FIG. 4 is not critical; FIG. 4 merely shows one example of the numerous configurations that may be used to encode information onto optical signals. It is understood that any technique for placing voice/data onto optical channels may be used with the protection switching system of the present invention. It is further noted that the boundaries of the elements in FIG. 4 are schematically illustrated only to show the various optical and electrical signal paths. Each of the various devices may or may not be packaged with adjacent devices when constructing the optical node depending upon the desired degree of modularity of each of the system devices (e.g., whether it is desired to package individual channel transponders separately, group them with the corresponding protect channel transponders, whether the transponders are packaged with the short-reach transmitters/receivers, optical network interface, plural components at the same level—such as the optical network controllers-contained in a single module, etc.).

When creating the optical channels to be added, duplicate copies of information to be encoded on a short reach optical signal are supplied to both the work short reach transmitter 555 and the protect short reach transmitter 565 from optical network interfaces 510, 520. Although not shown in the drawing, an electrical cross connection may be made between the work and protect optical network interfaces such that the work optical network interface may be used to supply information to the protect short reach transmitter/receiver and the protect optical network interface may be used to supply information to the work short reach transmitter/receiver in the event of a failure in the optical network interface. Assuming that the signal strength at short reach receiver 537 of transponder 530 is adequate, the work short reach transmitter 555 is activated and the optical signal is placed on optical path 557. Optical path 557 includes an optical splitter 558 such that the optical signal output by short reach transmitter 555 is sent to both the work receiver 537 of transponder 530 and the protect receiver 547 of transponder 540 via optical splitter 558 which placing duplicate copies of the optical signal onto optical paths 559 and 574. Traversing optical combiners 571 and 572, the duplicate signals are placed onto optical paths 575 and 576, which respectively lead to receiver 537 of transponder 530 and receiver 547 and transponder 540. In this manner, the information to be placed on the outgoing optical channel is present at both the work optical channel transmitter 532 and the protect optical channel transmitter 542 via the corresponding transponder receivers 537 and 547.

If transmitter 555 malfunctions, receiver 537 will detect an inadequate signal and transmitter 565 will be activated. The signal output from transmitter 565 is placed onto output optical path 567, split into two signals at splitter 568 and placed on paths 569 and 573 and to optical paths 575 and 576 via combiners 572 and 571. It is important to note that at no time are optical signals from both transmitter 555 and 565 present on any of the optical paths at the same time; the series of splitters, optical paths and combiners is used to create duplicate signal copies at the receive portions of transponders 530 and 540. although not shown for the sake of clarity, similar splitter, optical path, and combiner arrangements exist between receiver 552 and the transmitter portions 535 and 545 of the transponders and between receiver 562 and the transmitter portions 535 and 545 of the transponders.

The optical signal received at the receive portions 537, 547 of the transponders is converted to an electrical signal and the information used to modulate (directly or via external modulation as is known in the art) the transponder optical channel transmitters 532 or 542. Whether the work or protect transmitter is used depends upon the signal strength at the receive portion 531 of transponder 530. As long as the signal strength at the receive portion 531 of transponder 530 continues to be adequate, the work optical channel generator 532 is employed (since the section of the bidirectional optical network traversed by $\lambda_{W1}$, and $\lambda_{Wa}$ is the same, the optical path is considered to be viable as long as the matching work channel of the work channel pair continues to be received at the receive portion of the transponder). If the work transmitter 532 delivers an inadequate signal to its destination node, the destination node will automatically switch to transmitting traffic over the protect channel in a similar manner via control means which are responsive to the loss of signal strength. Upon receipt of the protect channel at the receive portion 541 of transponder 540, the protect optical channel transmitter 542 is activated as the work optical transmitter 532 is concomitantly inactivated. As understood by those in the art, the optical signal source (e.g., a DFB laser) typically is provided with a drive current to facilitate rapid protection switching (e.g., no delay due to laser initialization). When the system is operated using the protect optical signal source in a powered-up mode, empty frames or packets may be optionally carried by the protect channel over the bidirectional waveguide. In this manner, protection switching occurs whether the loss of signal is due to a waveguide interruption or due to a malfunction in the transmit/receive portion of the optical transponder. It is noted that although the optical transponders' protection switching scheme is shown in the context of a bidirectional optical node, the method of low signal level detection and switching to protect may also be employed in single direction WDM nodes for single directional WDM optical networks.

In another exemplary embodiment of the present invention, the optical network of FIG. 1A may optionally feature "wavelength re-use." That is, wavelengths used for an optical channel pair between a set of two optical nodes 100 may be employed for an optical channel pair between two optical nodes having a path that is not coextensive with the path between the first two optical nodes. This is demonstrated in FIG. 1C for the optical channel pair traveling between optical nodes A and E. As in FIG. 1A $\lambda_{W1}$ is added at node A and dropped at node E. Similarly, $\lambda_{Wa}$ is added at node E and dropped at node A. Now, in addition to these wavelengths being used as one channel pair between nodes A and E, they may also be used as an additional channel pair routed between nodes E and A. Because the portion of bidirectional waveguide 20 between nodes A and E (traversing nodes B, C, and D) is not coextensive with the optical path along waveguide 20 between paths E and A (traversing nodes F, G, and H), the same wavelengths may be used for this portion of the optical network. Although wavelength re-use is depicted between the identical nodes, this need not necessarily be the selected implementation. The same wavelengths re-used between nodes E and A could alternatively be used between nodes F and G or F and H since these paths are also non-coextensive with the A-E path. Note also that wavelength re-use can occur along multiple non-coextensive paths. For example, $\lambda_{W1}$, could be added at node E, dropped at node G, added at node G (with a new payload), and dropped at node A. Similarly, $\lambda_{Wa}$ could be added at node A, dropped at node G, added at node G (with a new payload), and dropped at node E while the channel-pair $\lambda_{Wa}$ continues to be used between nodes A and E traversing nodes B, C, and D.

Advantageously, wavelength re-use permits the construction of an optical network having optical channel wavelengths within a desired portion of an amplifier gain spectrum (e.g., within a relatively "flat" gain region of an erbium-doped fiber amplifier, minimizing gain equalization issues). For example in the optical network of FIG. 1, the 32 channel pairs may comprise 16 wavelengths in the C band of an erbium-doped fiber amplifier and 16 wavelengths in the L band of an erbium-doped fiber amplifier, each of the channel pairs being "re-used" 2 times within the optical network. In short, any selection of optical channel wavelengths may be made as long as the identical wavelengths are not used in the same direction for two or more optical channels on a co-extensive optical path between any two optical nodes.

Wavelength re-use can substantially simplify the creation of an optical network since similar optical nodes within the network, reducing the number of different types of optical nodes within the system. For example, using the 16 wavelength pairs re-used 2 times mentioned above in an 8-node optical ring network, only 4 different types of optical nodes would need to be deployed, each node configured to add-drop 4 wavelength pairs. Use of modular units for each optical channel (optionally paired with a protect channel pair, discussed below) allows further flexibility in optical node design since various combinations of channel pairs may then be add/dropped at each node. The fewer the number of different optical nodes (or sub-units thereof) needed to be manufactured, the less expensive the optical system. Also, the provision of replacement parts, "sparing," is greatly simplified since only two types of optical nodes need to be kept in inventory as spares for failure of any of the eight optical nodes shown in FIG. 1A.

Figure 3:
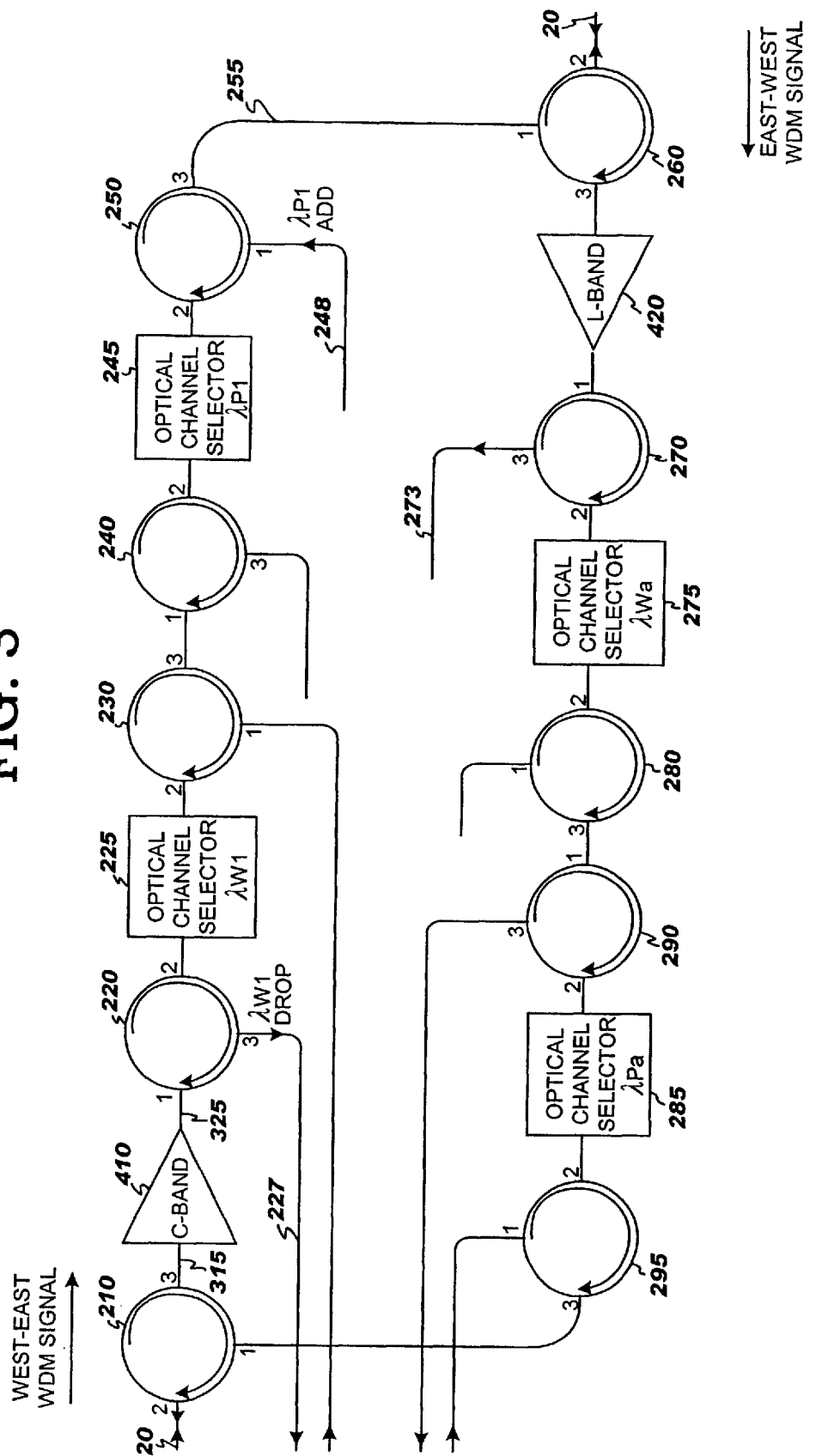
FIG. 3 depicts an exemplary add-drop multiplexer which may be used in a bidirectional optical network.

For the wavelength re-use bidirectional optical network depicted in FIG. 1C an exemplary bidirectional add-drop multiplexer 210 is shown in FIG. 3. The bidirectional optical add-drop multiplexer includes ten three-port optical circulators, 210, 220, 230, 240, 250, 260, 270, 280, 290, and 295 substantially similar to those described above in connection with FIG. 2.

As seen in FIG. 3, the west-east WDM optical signal enters optical port 2 of circulator 210 where it is output to optical path 315. Optical path 315 optically communicates with an optical amplifier 410. The optically-amplified west-east WDM signal exiting amplifier 410 traverses optical path 125 and enters the first optical port of circulator 220. Upon entering the first port of circulator 220, the west-east optical signals are transferred to output port 2. Output port 2 of circulator 220 optically communicates with optical channel selector 225. Upon encountering optical selector 225, one or more channels to be dropped from the west-east WDM signal are selected and routed back towards the second optical port of circulator 220. The remaining optical channels of the west-east WDM signal, i.e., the "through" channels $\lambda_{W2}, \lambda_{W3} \ldots$, are routed towards first optical port of circulator 230. As shown, channel $\lambda_{W1}$ is selected by channel selector 225 and routed back through optical port 2 where it is "dropped" at optical port 3 of circulator 220 onto optical path 227. From there, the selected optical channel may be routed directly to a receiver or it may be directed to another bidirectional (or unidirectional) optical system.

As the through optical channels are routed towards circulator 230, they enter the second optical port and exit through the third optical port onto output path 235. The "add" channels are input via optical path 237 to the first port of circulator 230. The added channels are output through optical port 2 of circulator 230 where they are re-routed by optical channel selector 225 back through port 2 of circulator 230, exiting through port 3 onto optical path 235 along with "through" optical channels of the west-east WDM optical signal. The add channels may be produced by a local optical transmitter or they may be channels that have been routed to the bidirectional add-drop multiplexer from another optical system or from another segment of the same bidirectional optical system.

In an exemplary embodiment, optical channel selector 225 comprises a chirped Bragg grating, i.e., a grating having a distribution of refractive index perturbations whose period varies along the axis of propagation. When a chirped grating is used in channel selector 225, the dropped optical channel is given a positive or negative chirp in the process of being diffracted by the grating, while the added optical channel is given a complementary negative or positive chirp, respectively, in the process of being diffracted by the same grating in the opposite direction. A positive chirp may be introduced in the added channel to reduce nonlinear interactions as the optical channel is transported along the bidirectional optical waveguide 20. This chirp is removed when the optical channel is diffracted by a chirped grating in the next drop operation; this "pre-chirp"/"de-chirp" procedure does not affect the detected signal nor interfere with any dispersion compensation techniques that may be employed in the bidirectional add-drop multiplexer or in other parts of the bidirectional WDM optical system.

As the west-east through channels and the added channels exit the third circulator onto optical path 325, they are directed towards the first port of circulator 240, exiting through the second port towards optical channel selector 245. Optical channel selector 245 includes a channel-selecting element such as a Bragg grating which is configured to add/drop a protect optical channel in connection with optical circulator 250. When the optical network is operating using the work channels (i.e., "normal" operation when there are no disruptions in the optical waveguide or at any optical node), the work channels will pass through optical channel selector 245 and associated circulators 240 and 250 without any optical traffic being added or dropped at that point.

To exit bidirectional add-drop multiplexer 200, optical channels pass through ports 2 and 3 of circulator 250 and are placed on optical path 255. Optical path 255 leads to the first port of optical circulator 260; the west-east WDM optical signal exits through port 2 of circulator 260 towards bidirectional waveguide 20. Simultaneously, east-west traffic enters the bidirectional add-drop multiplexer through port 2 of circulator 260, exiting through port 3 towards optical amplifier 420. In the exemplary embodiment, amplifier 420 is an L-band optical amplifier but may also be selected from any of the other devices discussed above in connection with amplifier 410.

The east-west optical traffic proceeds towards optical circulator 270 entering through port 1 and exiting through port 2 towards optical channel selector 275. Optical channel selector 275 is substantially similar to selector 225 in that it may be comprised of the optical elements set forth above. Of course, optical channel selector 275 is configured to interact with a work channel wavelength from the east-west WDM signal, rather that the west-east work channel wavelength of channel selector 225. In the exemplary embodiment, channel selector 275 would select an L-band channel while channel selector 225 would select a C-band channel. The dropped optical channel exits through port 3 of circulator 270 onto optical path 273; the added optical channel enters through from optical path 277 through port one of circulator 280 and is selected by channel selector 275, re-entering optical circulator 280 through port 3 and exiting, along with the through east-west optical channels through port 2 onto optical path 283.

As with the C-band arm of the bidirectional add-drop multiplexer discussed above, the L-band arm of add-drop multiplexer 200 includes a channel selector configured to add-drop a protect optical channel; in the exemplary embodiment, the protect optical channel in the L-band would be associated with the work channel in the C-band in the C-band arm of the bidirectional add-drop multiplexer described above. Similarly, the L-band work channel selector 275 would be associated with the C-band protect optical channel of channel selector 245. When the system is operating in work mode with respect to optical channels $\lambda_{W1}$ and $\lambda_{Wa}$, the east-west optical channels pass through elements 290, 285, and 295 without an optical channel being add-dropped to the east-west WDM optical signal.

Completing the optical path towards the bidirectional optical transmission waveguide 20, the east-west optical WDM signal, along with the added optical channels, are input to the first optical port of the first optical circulator 210, where they rejoin bidirectional waveguide 20. The east-west WDM optical signal is continually output to bidirectional optical transmission waveguide 20 through port 2 of the first circulator as the west-east WDM optical signal is continually input to the bidirectional add-drop multiplexer through port 2 of the first circulator 210.

An exemplary optical node for use with the wavelength re-use optical network of FIG. 1C is depicted in FIG. 5. Bidirectional add-drop multiplexer 200 of FIG.5 is employed in this optical node. As discussed above, wavelength re-use may occur more than once in a given optical network. For example, in the network shown in FIG. 1C, the optical channel pair $\lambda_{W1}$ $\lambda_{Wa}$ may be add-dropped at node G; in such a network configuration, the optical channel pair $\lambda_{W1}$ $\lambda_{Wa}$ would be used between nodes A and E, between nodes E and G, and between nodes G and A. Because the same protect optical channel wavelengths are paired with the same work channel wavelengths, protection switching as a result of disruption between nodes A and E would result in the protect optical channel destined for node E being selected at intermediate optical node G. For this reason, the optical transmitter/receiver system of FIG. 5 is provided with the capability to re-transmit a protect optical channel selected by an optical channel selector but not destined for that intermediate node. This element functions effectively as an electrical cross connect that re-routes the information from the dropped protection channel to an outgoing protection channel to be dropped at the destination node. This feature is shown in transponders 710 and 720. Transponder 720 receives a protect channel $\lambda_{P1}$ at receive portion 721 and includes the capability for optionally re-transmitting that optical channel via transponder transmitter 722. Advantageously, because this node includes wavelength re-use, transponder transmitter 722 can alternatively be used as the work channel transmitter for the protect channel of the "re-used" work channel $\lambda_{Wa}$. Similarly, transponder 710 may use receive portion 711 coupled with transmit portion 712 to re-transmit a protect channel or to initially transmit a protect channel, depending upon which optical path of the re-used channel pair is being protection-switched.

The corresponding short-reach transmit and receive portions 715, 717, 725, and 727, communicate with short reach transmitters/receivers 752, 755, 762, 765 in a substantially similar manner as in the embodiment of FIG. 4. The wavelength re-use transponder 730 with transmitter/receiver portions 731, 732, 735, and 737 operates substantially similarly to transponder 530 except that it transmits $\lambda_{Wa}$ and receives $\lambda_{W1}$ to/from add-drop multiplexer 200. The optical paths between the transponders 530, 710, 730, and 740 and short reach transmitters/receivers 552, 555, 752, 755, 762, 765, 772, and 775 also include the splitter/combiner arrangements depicted in FIG. 4 but are not shown here for clarity of presentation.

As in the embodiment of FIG. 4, optical network controllers 510, 780, 785, and 790 receive information through cell formation module 601 and TDM format module 602 (although, as discussed in connection with that figure, such aggregation is exemplary and numerous other techniques may be used to gather/distribute the information to/from the optical channels.

According to the present protection switching in a bidirectional optical network is provided in which protection switching for counter-propagating optical signals may be provided in a single bidirectional optical waveguide. Note that in systems having more than one waveguide, each waveguide may implement the protection switching system of the present invention to achieve a desired optical traffic capacity; alternatively, protection capacity may be reserved on each optical fiber such that in the event of a waveguide disruption the protect capacity may be routed onto the uninterrupted optical path.

While the above invention has been described with reference to the particular exemplary embodiments, many modifications and functionally equivalent elements may be substituted without departing from the spirit and contributions of the present invention. For example, as discussed above, the optical nodes of the present invention may have numerous configurations as long as the designated optical channels may be generated and received at that node. Optical amplifiers, optical network control systems, optical service channels, temperature regulators, wavelength stabilization schemes, etc. may all be optionally provided in the optical nodes. Traffic may be aggregated onto the optical channels in a variety of known manners. The optical channels may include a single format (e.g., TDM) or multiple data formats (cell-based such as MPLS, IP, Ethernet. Accordingly, modifications and functionally equivalent elements such as those suggested above, but not limited thereto, are considered to be within the scope of the following claims.

What is claimed is:

1. A system for protection switching in a wavelength division multiplexed optical communication network including optical transponders within optical nodes comprising:

an optical communication network including a plurality of optical nodes, each optical node including means for adding and dropping an optical channel from an optical waveguide configured to carry wavelength division multiplexed optical communication signals;

a first work optical transponder positioned to receive a first work optical channel dropped by the optical add-drop multiplexer, the first work optical transponder including receiving means for converting the dropped work optical channel to an electrical signal and transmitting means for generating a short-reach optical signal modulated with information from the dropped work optical channel;

a second work optical transponder positioned to add a work optical channel to the optical add-drop multiplexer, the second work optical transponder including a work optical transmitter for creating a work optical channel to be added to a wavelength division multiplexed optical signal carried by the optical waveguide and a receiving means for receiving a short-reach optical signal modulated with information to be placed on the work optical channel to be added;

a first protect optical transponder positioned to receive a protect optical channel dropped by the optical add-drop multiplexer, the first protect optical transponder including receiving means for converting the dropped protect optical channel to an electrical signal and transmitting means for generating a short-reach optical signal modulated with information from the dropped protect optical channel;

a second protect optical transponder positioned to add a protect optical channel to the optical add-drop multiplexer, the second protect optical transponder including an optical transmitter for creating a protect optical channel to be added to a wavelength division multiplexed optical signal carried by the optical waveguide and a receiving means for receiving a short-reach optical signal modulated with information to be placed on the protect optical channel to be added;

means for detecting the strength of the optical channel received by the first work optical transponder;

control means responsive to the means for detecting the strength of the optical channel received by the first work optical transponder, the control means activating the second protect transponder and inactivating the second work transponder when the strength of the optical channel received by the first work optical transponder falls below a preset level.

2. A system for protection switching in a wavelength division multiplexed optical communication network as recited in claim 1 further including optical transmitters and optical receivers within the optical node for receiving optical signals from corresponding transponders and transmitting optical signals to corresponding transponders.

3. A system for protection switching in a wavelength division multiplexed optical communication network as recited in claim 1 further including a short reach optical transmitter having an optical path to both a work transponder and a protect transponder.

4. A system for protection switching in a wavelength division multiplexed optical communication network as recited in claim 1 which includes at least one short reach optical receiver having an optical path to both a work transponder and a protect transponder.

5. A system for protection switching in a wavelength division multiplexed optical communication network as recited in claim 1 wherein wavelengths used by the optical channels added and dropped at the optical node of claim 1 are used again at a further optical node within the optical communication network.

6. A system for protection switching in a wavelength division multiplexed optical communication network as recited in claim 5 further comprising third and fourth optical transponders configured such that a protect optical channel dropped at the optical node may be re-transmitted to the optical waveguide.

7. A system for protection switching in a wavelength division multiplexed optical communication network as recited in claim 1 wherein the add-drop multiplexer is a bidirectional add-drop multiplexer.

8. A system for protection switching in a wavelength division multiplexed optical communication network as recited in claim 2 further comprising optical network interfaces electrically communicating with the optical transmitters and optical receivers for transmitting and distributing information to be placed on the work and protect optical channels.

9. A system for protection switching in a wavelength division multiplexed optical communication network including optical transponders within optical nodes comprising:

an optical communication network including a plurality of optical nodes, each optical node including means for adding and dropping an optical channel from an optical waveguide configured to carry wavelength division multiplexed optical communication signals;

a first work optical transponder positioned to receive a first work optical channel dropped by the optical add-drop multiplexer, the first work optical transponder including receiving means for converting the dropped work optical channel to an electrical signal and transmitting means for generating a short-reach optical signal modulated with information from the dropped work optical channel;

a second work optical transponder positioned to add a work optical channel to the optical add-drop multiplexer, the second work optical transponder including a work optical transmitter for creating a work optical channel to be added to a wavelength division multiplexed optical signal carried by the optical waveguide and a receiving means for receiving a short-reach optical signal modulated with information to be placed on the work optical channel to be added;

a first protect optical transponder positioned to receive a protect optical channel dropped by the optical add-drop multiplexer, the first protect optical transponder including receiving means for converting the dropped protect optical channel to an electrical signal and transmitting means for generating a short-reach optical signal modulated with information from the dropped protect optical channel;

a second protect optical transponder positioned to add a protect optical channel to the optical add-drop multiplexer, the second protect optical transponder including an optical transmitter for creating a protect optical channel to be added to a wavelength division multiplexed optical signal carried by the optical waveguide and a receiving means for receiving a short-reach optical signal modulated with information to be placed on the protect optical channel to be added;

means for detecting the presence of the first protect optical channel received by the first protect optical transponder;

control means responsive to the means for detecting the presence of the optical channel received by the first protect optical transponder, the control means activating the second protect transponder and inactivating the second work transponder in response to receiving a protect optical channel at the first protect optical transponder.

10. A system for protection switching in a wavelength division multiplexed optical communication network as recited in claim 9 further including optical transmitters and optical receivers within the optical node for receiving optical signals from corresponding transponders and transmitting optical signals to corresponding transponders.

11. A system for protection switching in a wavelength division multiplexed optical communication network as recited in claim 9 further including a short reach optical transmitter having an optical path to both a work transponder and a protect transponder.

12. A system for protection switching in a wavelength division multiplexed optical communication network as recited in claim 9 which includes at least one short reach optical receiver having an optical path to both a work transponder and a protect transponder.

13. A system for protection switching in a wavelength division multiplexed optical communication network as recited in claim 1 wherein wavelengths used by the optical channels added and dropped at the optical node of claim 1 are used again at a further optical node within the optical communication network.

14. A system for protection switching in a wavelength division multiplexed optical communication network as recited in claim 13 further comprising third and fourth optical transponders configured such that a protect optical channel dropped at the optical node may be re-transmitted to the optical waveguide.

* * * * *